US012573853B2

(12) United States Patent
Rollins et al.

(10) Patent No.: US 12,573,853 B2
(45) Date of Patent: Mar. 10, 2026

(54) CONTROL SYSTEM FOR DISPATCHING OPTIMIZED REAL AND REACTIVE POWER SET POINTS

(71) Applicant: BURNS & MCDONNELL ENGINEERING COMPANY, INC., Kansas City, MO (US)

(72) Inventors: Daniel Rollins, Overland Park, KS (US); Derek Stuchlik, Overland Park, KS (US)

(73) Assignee: BURNS & MCDONNELL ENGINEERING COMPANY, INC., Kansas City, MO (US)

( * ) Notice: Subject to any disclaimer, the term of this patent is extended or adjusted under 35 U.S.C. 154(b) by 710 days.

(21) Appl. No.: 17/875,383

(22) Filed: Jul. 27, 2022

(65) Prior Publication Data

US 2024/0039293 A1 Feb. 1, 2024

(51) Int. Cl.
*H02J 3/46* (2026.01)
*G05B 19/042* (2006.01)
(Continued)

(52) U.S. Cl.
CPC .............. *H02J 3/46* (2013.01); *G05B 19/042* (2013.01); *H02J 3/18* (2013.01); *H02J 3/32* (2013.01);
(Continued)

(58) Field of Classification Search
USPC ........................................................ 700/295
See application file for complete search history.

(56) References Cited

U.S. PATENT DOCUMENTS 8,957,535 B2 * 2/2015 Hjort ...................... F03D 7/028
290/55
9,244,506 B2 1/2016 Nielsen et al.
(Continued)

FOREIGN PATENT DOCUMENTS

DE 102015122640 A 6/2017
EP 3005515 B1 * 6/2020 ................ H02J 3/48
(Continued)

OTHER PUBLICATIONS

CN_110854904_A (Year: 2020).*
(Continued)

*Primary Examiner* — Hien D Khuu
(74) *Attorney, Agent, or Firm* — Stinson LLP

(57) ABSTRACT

A control system is provided for controlling multiple power sources of a power system. The control system calculates real and reactive power set points for each of the power sources utilizing: (1) a feedforward power compensation function that provides optimized site level set points; (2) a real power set point derivation scheme in which the real power set points are selected based on the energy capacity of the energy storage devices; (3) a state of charge (SOC) balancing scheme that substantially balances the state of charge of the energy storage devices; (4) a remainder function to account for real-time limits imposed by the equipment; and/or (5) a reactive power set point derivation scheme in which the reactive power set points are selected to minimize the total apparent power across the power sources.

20 Claims, 6 Drawing Sheets

(51) Int. Cl.

| | |
|---|---|
| *H02J 3/18* | (2006.01) |
| *H02J 3/32* | (2006.01) |
| *H02J 3/38* | (2006.01) |
| *H02J 7/02* | (2016.01) |
| *H02J 7/52* | (2026.01) |
| *H02J 7/82* | (2026.01) |
| *H02J 101/24* | (2026.01) |
| *H02J 101/28* | (2026.01) |

(52) U.S. Cl.

CPC ............... *H02J 3/381* (2013.01); *H02J 7/02* (2013.01); *H02J 7/52* (2026.01); *H02J 7/82* (2026.01); *G05B 2219/2639* (2013.01); *H02J 2101/24* (2026.01); *H02J 2101/28* (2026.01); *H02J 2207/20* (2020.01)

(56) References Cited

U.S. PATENT DOCUMENTS

| | | | | |
|---|---|---|---|---|
| 9,941,700 | B2 | 4/2018 | Bhavaraju et al. | |
| 11,128,141 | B2 | 9/2021 | Marchegiani et al. | |
| 11,309,708 | B2 | 4/2022 | Ley et al. | |
| 2014/0103726 | A1* | 4/2014 | Martin | H02M 1/36 307/64 |
| 2016/0084229 | A1* | 3/2016 | Garcia | H02J 3/1857 290/44 |
| 2018/0052478 | A1* | 2/2018 | Varma | H02J 3/18 |
| 2019/0305551 | A1* | 10/2019 | Ley | H02J 3/388 |
| 2020/0274365 | A1* | 8/2020 | Hart | H02J 3/32 |
| 2021/0399549 | A1* | 12/2021 | Casal Vilana | H02J 3/16 |
| 2022/0021217 | A1 | 1/2022 | Wenrick | |
| 2022/0065162 | A1* | 3/2022 | Hunt | F02C 3/20 |
| 2022/0082085 | A1 | 3/2022 | Wei et al. | |

FOREIGN PATENT DOCUMENTS

| | | | | |
|---|---|---|---|---|
| WO | WO-2013167141 A1 * | 11/2013 | ............ | F03D 7/028 |
| WO | 2015123549 | 8/2015 | | |
| WO | 2019145376 | 8/2019 | | |
| WO | WO-2020051264 A1 * | 3/2020 | ............. | H02J 3/381 |
| WO | 2021037320 | 3/2021 | | |
| WO | WO-2022002332 A1 * | 1/2022 | ........... | F03D 7/0284 |
| WO | 2022128032 | 6/2022 | | |

OTHER PUBLICATIONS

ES_2917379_T3 (Year: 2022).*

Asensio et al. "Master of Power: A Power Plant Controller and Energy Management System concept", IEEE, 2017, p. 1-6. (Year: 2017).*

KR_1964740_B1 (Year: 2019).*

CN_107431361_A (Year: 2017).*

Bullich-Massague, et al., "Active power control in a hybrid PV-storage power plant for frequency support", Solar Energy, vol. 144, Mar. 1, 2017, pp. 49-62, located at https://www.sciencedirect.com/science/article/pii/S0038092X16306375 (32 pgs).

Xu, et al., "Application and Modeling of Battery Energy Storage in Power Systems", CSEE Journal of Power and Energy Systems, vol. 2, No. 3, Sep. 2016, located at https://dialog.proquest.com/professional/docview/2323120304/1811129F6E5217A938C/2?accountid= 157282 (9 pgs).

Collins, et al., "Real and reactive power control of distributed PV inverters for overvoltage prevention and increased renewable generation hosting capacity", Renewable Energy 81 (2015) pp. 464-471, located at https://isidl.com/wp-content/uploads/2017/09/7629-English-ISIDL.pdf (8 pgs).

Gevorgian, et al., "Photovoltaic Plant and Battery Energy Storage System Integration at NREL's Flatirons Campus", Technical Report, National Renewable Energy Laboratory, Feb. 2022, located at https://www.nrel.gov/docs/fy22osti/81104.pdf (109 pgs).

Turitsyn, et al., "Options for Control of Reactive Power by Distributed Photovoltaic Generators", Proceedings of the IEEE, vol. 99, No. 6, Jun. 2011, located at http://www.mit.edu/~turitsyn/assets/pubs/Turitsyn2011fv.pdf (11 pgs).

* cited by examiner

Figure 1:
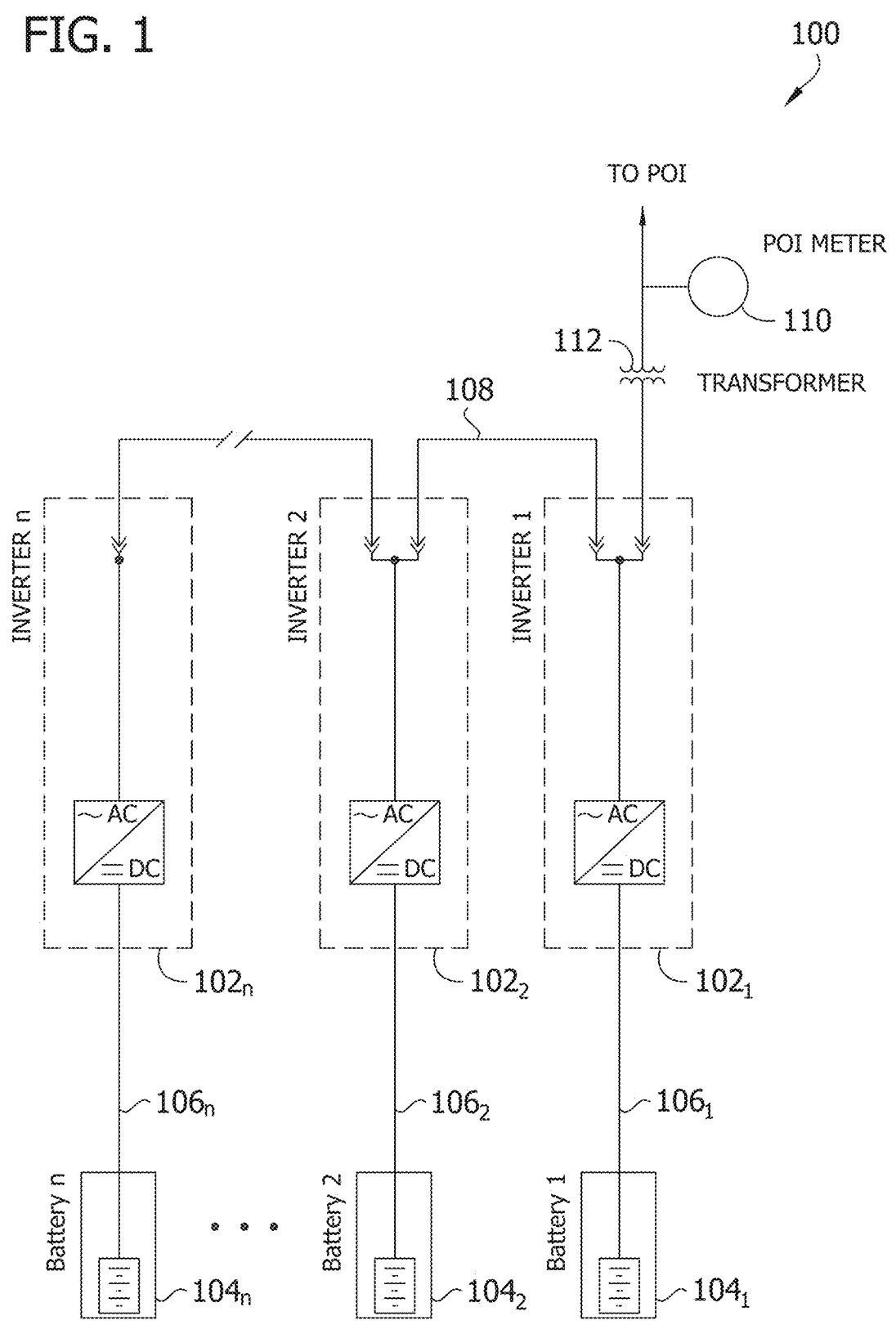

TO POI

POI METER

110

112

TRANSFORMER

108

INVERTER n

INVERTER 2

INVERTER 1

~AC

=DC

~AC

=DC

~AC

=DC

102n

102₂

102₁

106n

106₂

106₁

Battery n

Battery 2

Battery 1

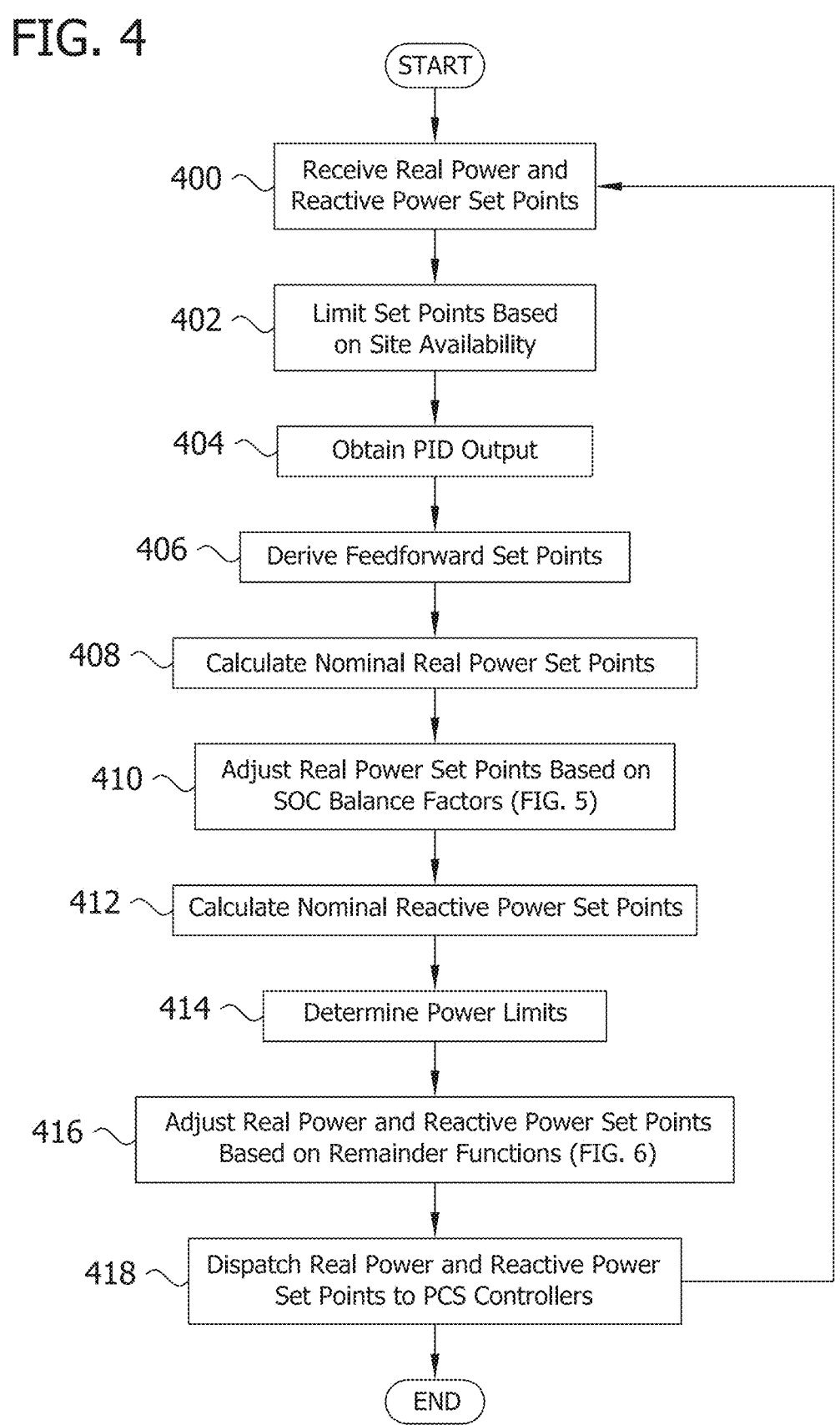

START

400 — Receive Real Power and Reactive Power Set Points

402 — Limit Set Points Based on Site Availability

404 — Obtain PID Output

406 — Derive Feedforward Set Points

408 — Calculate Nominal Real Power Set Points

410 — Adjust Real Power Set Points Based on SOC Balance Factors (FIG. 5)

412 — Calculate Nominal Reactive Power Set Points

414 — Determine Power Limits

416 — Adjust Real Power and Reactive Power Set Points Based on Remainder Functions (FIG. 6)

418 — Dispatch Real Power and Reactive Power Set Points to PCS Controllers

END

CONTROL SYSTEM FOR DISPATCHING OPTIMIZED REAL AND REACTIVE POWER SET POINTS

BACKGROUND OF THE INVENTION

1. Field of the Invention

The present disclosure is generally related to control systems and, more particularly, to control systems for controlling power sources used to supply power to and/or absorb power from a power grid or other AC load.

2. Description of Related Art

Power plants and other sites utilize various types of power sources to generate and supply power to a power grid or other AC load. Some sites include power generation systems, such as conventional fossil fuel generators or renewable energy systems that derive electrical power from various sources of renewable energy, such as solar energy from the sun, wind energy, geothermal energy from heat inside the earth, biomass from plants, or hydropower from flowing water. Other sites include energy storage systems, such as a battery energy storage system (BESS), which are either standalone systems or coupled with one or more power generation systems.

Each site receives or calculates power requirements that determine the amount of real power and reactive power that are required to be produced by the site at any specific time. The power requirements will vary in accordance with the AC load, among other factors, which will change the set points provided to the site. Most sites use a centralized control system to ensure that the real and reactive power supplied at a point of interconnection (POI) to the AC load fulfills the power requirements. A common type of control system uses proportional-integral-derivative (PID) controllers that dispatch real and reactive power set points to one or more power sources located at the site. If the power requirements are not being fulfilled, the PID controllers adjust the real and reactive power set points dispatched to the power sources in order to compensate for any deviations from the power requirements.

While PID controllers are sufficient for controlling certain types of power sources, they are not ideal for a site in which the set points must be quickly adjusted. In particular, ND controllers are reactionary devices that provide relatively slow response rates. If sped up, PID controllers are prone to overshooting or undershooting the site's set points, which causes inaccuracy/lack of precision and instability in the power grid or other AC load. Thus, PID controllers cannot generally achieve the ramp rates and accuracy requirements that are required in many implementations.

Another drawback with conventional control systems is that the set points are dispatched to the power sources without regard to the actual operating characteristics of the power sources. For example, it is common for control systems to evenly distribute power demands without any consideration of the energy storage capabilities of the power sources. This may cause a number of problems, such as uneven wearing of the devices, lower efficiency of the devices, excess use of power/energy, an unbalanced storage of energy across the devices, the circulation of reactive or even real power, and other issues known in the art.

Thus, there remains a need in the art for an improved control system and control methodologies that overcome some or all of the drawbacks associated with existing control systems and/or that offers other advantages compared to existing control systems.

BRIEF SUMMARY OF THE INVENTION

The present invention is directed to a control system for dispatching optimized real and reactive power set points to each of a plurality of power sources located at a power plant or other site. In some embodiments, each of the power sources comprises a power conversion system associated with one or more energy storage systems; however, certain control features may also be used with other types of power sources. The control system calculates the real and reactive power set points for each of the power sources utilizing one or more of: (1) a feedforward power compensation function that provides optimized site level set points for speed, accuracy and stability; (2) a real power set point derivation scheme in which the real power set points are selected based on the energy capacity of the energy storage devices to prevent state of charge (SOC) imbalancing, thus improving efficiency, runtime, wear, etc.; (3) an SOC balancing scheme that addresses SOC imbalance that has occurred, typically due to external factors; (4) a remainder function to account for real-time limits imposed by the equipment that would otherwise both prevent the correct set point from being dispatched and/or require the MD to further deal with the resulting failure to meet set point based on the feedback; and (5) a reactive power set point derivation scheme in which the reactive power set points are selected to minimize the total apparent power across the power sources to reduce the total apparent power/current across the entire site, thus reducing losses, heat, wear, etc.

A power system in accordance with one embodiment of the invention described herein comprises a plurality of power sources for supplying power to an AC load, wherein each of the power sources comprises a power conversion system associated with one or more energy storage devices. The power system also comprises a control system configured to individually control each of the power sources by: calculating a nominal real power set point for the power source, wherein the nominal real power set point is calculated based on an energy capacity of the one or more energy storage devices of the power source and a total energy capacity of available energy storage devices within the power system; and dispatching a real power demand based on the nominal real power set point to the power source.

A power system in accordance with another embodiment of the invention described herein comprises a plurality of power sources for supplying power to or absorbing power from an AC load. The power system also comprises a control system configured to individually control each of the power sources by: calculating a nominal reactive power set point for the power source, wherein the nominal reactive power set point is calculated based on a reactive power limit for the power source and a total reactive power limit for available power sources within the power system; and dispatching a reactive power demand based on the nominal reactive power set point to the power source.

A power system in accordance with another embodiment of the invention described herein comprises a plurality of power sources for supplying power to an AC load, wherein each of the power sources comprises a power conversion system associated with one or more energy storage devices. The power system also comprises a control system configured to control each of the power sources by: calculating a nominal real power set point for the power source; calculating a state of charge balance factor for the power source; adjusting the nominal real power set point based on the state of charge balance factor to determine an adjusted real power set point; and dispatching a real power demand based on the adjusted real power set point to the power source.

A power system in accordance with another embodiment of the invention described herein comprises a plurality of power sources for supplying power to or absorbing power from an AC load. The power system also comprises a control system configured to: obtain a site real power set point; calculate a feedforward real power set point based on the site real power set point and one or more power losses; and for each of the power sources, (i) calculate a real power set point based on the feedforward real power set point and (ii) dispatch a real power demand based on the real power set point to the power source.

A power system in accordance with yet another embodiment of the invention described herein comprises a plurality of power sources for supplying power to or absorbing power from an AC load. The power system also comprises a control system configured to: obtain a site reactive power set point; calculate a feedforward reactive power set point based on the site reactive power set point and one or more power losses; and for each of the power sources, (i) calculate a reactive power set point based on the feedforward reactive power set point and (ii) dispatch a reactive power demand based on the reactive power set point to the power source.

Various other embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

A detailed description of various exemplary embodiments of the present invention is provided below with reference to the following drawings, in which:

FIG. 1 is a system block diagram of a power system in accordance with one embodiment of the invention;

FIG. 4 is a process flow diagram of a main control process that may be executed by the control system shown in FIG. 3;

DETAILED DESCRIPTION OF EXEMPLARY EMBODIMENTS

Figure 2:
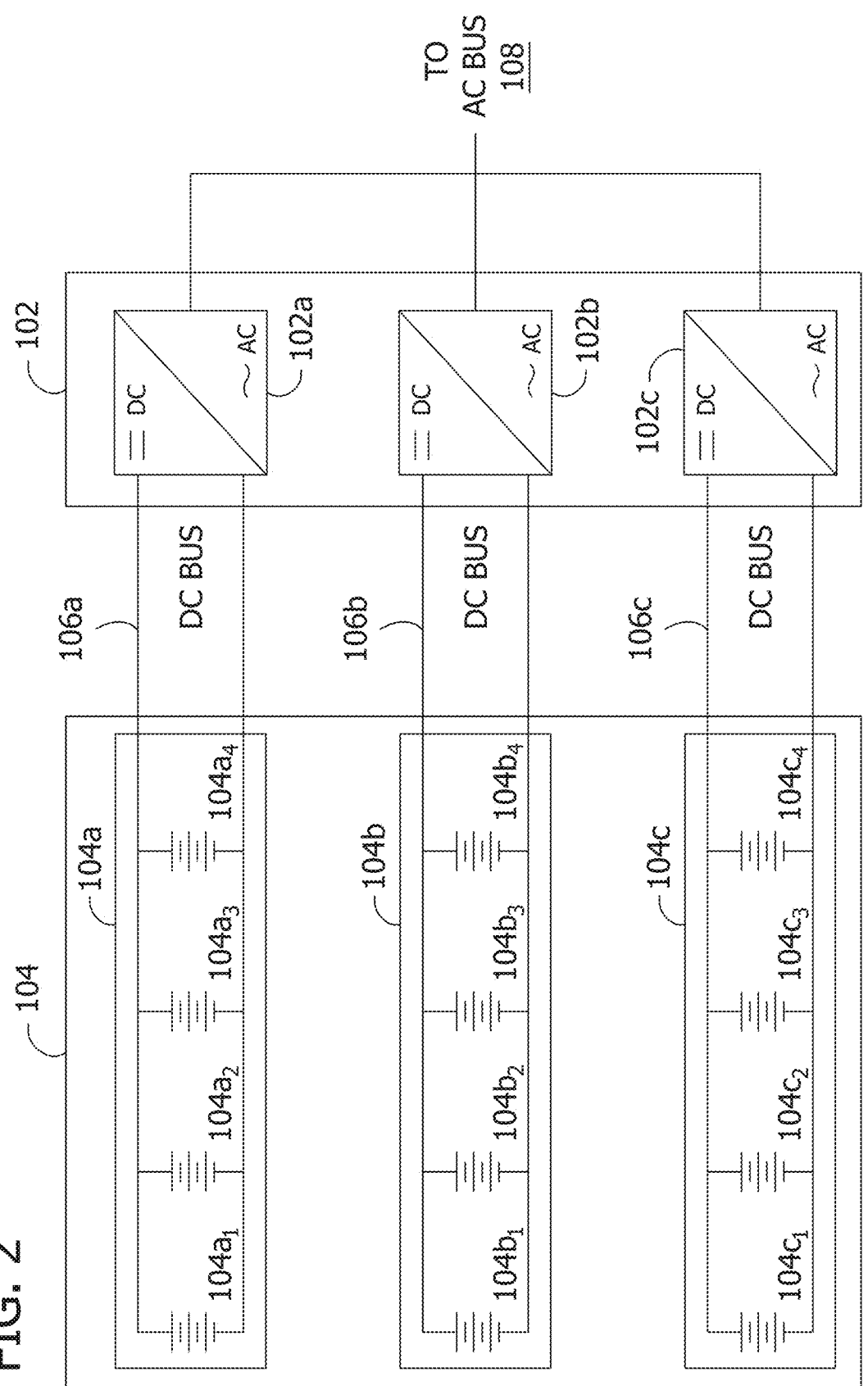
FIG. 2 is a system block diagram of a power conversion system (PCS) with three PCS devices each of which is connected to a battery group for use in the power system shown in FIG. 1.

The present invention is directed to a control system for dispatching optimized real and reactive power set points to each of a plurality of power sources located at a power plant or other site. While the invention will be described in detail below with reference to various exemplary embodiments, it should be understood that the invention is not limited to the specific system configurations or methods of these embodiments. In addition, although the exemplary embodiments are described as embodying several different inventive features, one skilled in the art will appreciate that any one of these features could be implemented without the others in accordance with the invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

The control system of the present invention will be described below in the context of a power system in which each of the power sources comprise a power conversion system associated with one or more energy storage devices (e.g., a BESS system). Of course, other types of energy storage systems may also be controlled in accordance with the present invention, including mechanical storage such as a flywheel energy storage systems (FESS), compressed air energy storage (CAES), isothermal CAES, pumped hydro storage system (PHS), or hydrogen energy storage. In addition, it will be seen that the control system includes certain control features that may be used to control a variety of other types of power sources, such as renewable energy systems that generate wind power, solar (photovoltaic) power, geothermal power, biomass, and hydroelectric power. Further, the control system may be used to control a power system that includes a combination of different types of power sources, such as multiple BESS systems coupled to conventional fossil fuel generators or renewable energy system. Thus, in its simplest form, a "power source" is any device or combination of devices that supply power to an AC load and/or absorb power from an AC load. Various implementations will be apparent to one skilled in the art.

Power System

Referring to FIG. 1, a power system in accordance with an exemplary embodiment of the present invention is shown generally as reference number 100. As shown, power system 100 includes a plurality of power conversion systems (PCS) $102_1$, $102_2$ to $102_n$ and a plurality of associated battery groups $104_1$, $104_2$ to $104_n$. Each power conversion system and associated battery group comprise a "power source" of power system 100, i.e., power conversion system $102_1$ and battery group $104_1$ comprise a first power source, power conversion system $102_2$ and battery group $104_2$ comprise a second power source, etc.

In general terms, each of battery groups $104_1$, $104_2$ to $104_n$ includes one or more individual batteries configured to charge and discharge DC current, i.e., the batteries can be charged using power from a power grid or other AC load and can discharge power to a power grid or other AC load. In a non-limiting example, each of battery groups $104_1$, $104_2$ to $104_n$ comprises a battery bank with one or more battery racks connected to one of DC power buses $106_1$, $106_2$ to $106_n$. It can be appreciated that the number of battery racks in each of battery groups $104_1$, $104_2$ to $104_n$ may be the same or different from those of other battery groups. For example, battery group $104_1$ may include 4 battery racks, battery group $104_2$ may include 12 battery racks, etc. Also, the type of battery racks may vary within the same battery group or between battery groups. Each of the battery racks consists of a plurality of individual batteries that utilize any existing or future reusable battery technology, including lithium ion batteries, lead acid batteries, or flow batteries.

Each of power conversion systems $102_1$, $102_2$ to $102_n$ is configured to convert electrical current between DC power buses $106_1$, $106_2$ to $106_n$ and a common AC power bus $108$. In this embodiment, each of power conversion systems $102_1$, $102_2$ to $102_n$ is capable of converting AC current to DC current when battery groups $104_1$, $104_2$ to $104_n$ are charging and converting DC current to AC current when battery groups $104_1$, $104_2$ to $104_n$ are discharging. Power conversion systems $102_1$, $102_2$ to $102_n$ may be separately controlled such that one or more power conversion systems are in a charging mode while one or more other power conversion systems are in a discharging mode. Each of power conversion systems $102_1$, $102_2$ to $102_n$ also has the ability to inject or absorb reactive power. Of course, in other embodiments, each power conversion system may comprise an inverter that is only capable of converting DC current to AC current (e.g., an inverter associated with one or more photovoltaic modules).

It should be understood that each of power conversion systems $102_1$, $102_2$ to $102_n$ may include a single PCS device or multiple PCS devices (e.g., a system in which 2, 3, 4 or 6 PCS devices are provided on the same skid). For example, FIG. 2 shows a power conversion system $102$ with three PCS devices $102a$, $102b$ and $102c$, which is associated with a battery system $104$ comprised of three battery groups $104a$, $104b$ and $104c$. Each of battery groups $104a$, $104b$ and $104c$ includes four battery racks connected in parallel to a DC bus—i.e., battery group $104a$ includes battery racks $104a_1$, $104a_2$, $104a_3$ and $104a_4$ connected in parallel to DC power bus $106a$, battery group $104b$ includes battery racks $104b_1$, $104b_2$, $104b_3$ and $104b_4$ connected in parallel to DC power bus $106b$, and battery group $104c$ includes battery racks $104c_1$, $104c_2$, $104c_3$ and $104c_4$ connected in parallel to DC power bus $106c$. In this type of arrangement, each PCS device and associated battery group is considered a power source—i.e., there are three power sources in FIG. 2. The PCS controller associated with power conversion system $102$ may receive a real power set point for each of PCS devices $102a$, $102b$ and $102c$, as well as a single reactive power set point for all of the PCS devices.

Referring back to FIG. 1, the AC current output by each of power conversion systems $102_1$, $102_2$ to $102_n$ is provided to a common AC power bus $108$. The AC power bus $108$ is coupled to the primary (input) side of a transformer $112$, and the secondary (output) side of transformer $112$ is coupled to the point of interconnection (POI) with a power grid or other AC load (sometimes referred to as a point of common coupling (PCC)). Transformer $112$ is configured to step up the voltage to any suitable utility voltage, e.g., 34.5 kV, 345 kV, etc.

At the POI, a POI meter $110$ is provided to measure the total real power (P) and total reactive power (Q) generated by the power sources of power system $100$ and output to the power grid or other AC load. POI meter $110$ may also measure other parameters, such as the voltage (V), the current (I), the apparent power, and the frequency (f) at the POI. POI meter $110$ includes a communications board that enables transmission of these parameters to a control system $302$, as described in greater detail below in connection with FIG. 3. Of course, in other embodiments, there may be more than one POI meter (e.g., in cases where there is more than one POI).

It should be understood that power system $100$ may include additional components that are not shown in FIG. 1. For example, power system $100$ may include any number of transformers, e.g., a transformer may be located between each of power conversion systems $102_1$, $102_2$ to $102_n$ and AC power bus $108$; additional transformers may be located between AC power bus $108$ and transformer $112$; and/or additional transformers may be used in connection with more than one AC bus (in cases where the power conversion systems are coupled to different AC buses). Of course, certain implementations may not utilize any transformers at all (if the output voltage is sufficient out of the power conversion systems). Also, power system $100$ will typically include an auxiliary power system that includes a number of different types of equipment for supporting the operation of the site (e.g., heating, ventilation and air conditioning systems), as known to one skilled in the art.

It should be understood that power system $100$ may be located at a power plant or another site, such as a system connected to a building or campus that is used to augment/offset power usage, to provide blackstart capabilities, or to provide battery backup.

Figure 3:
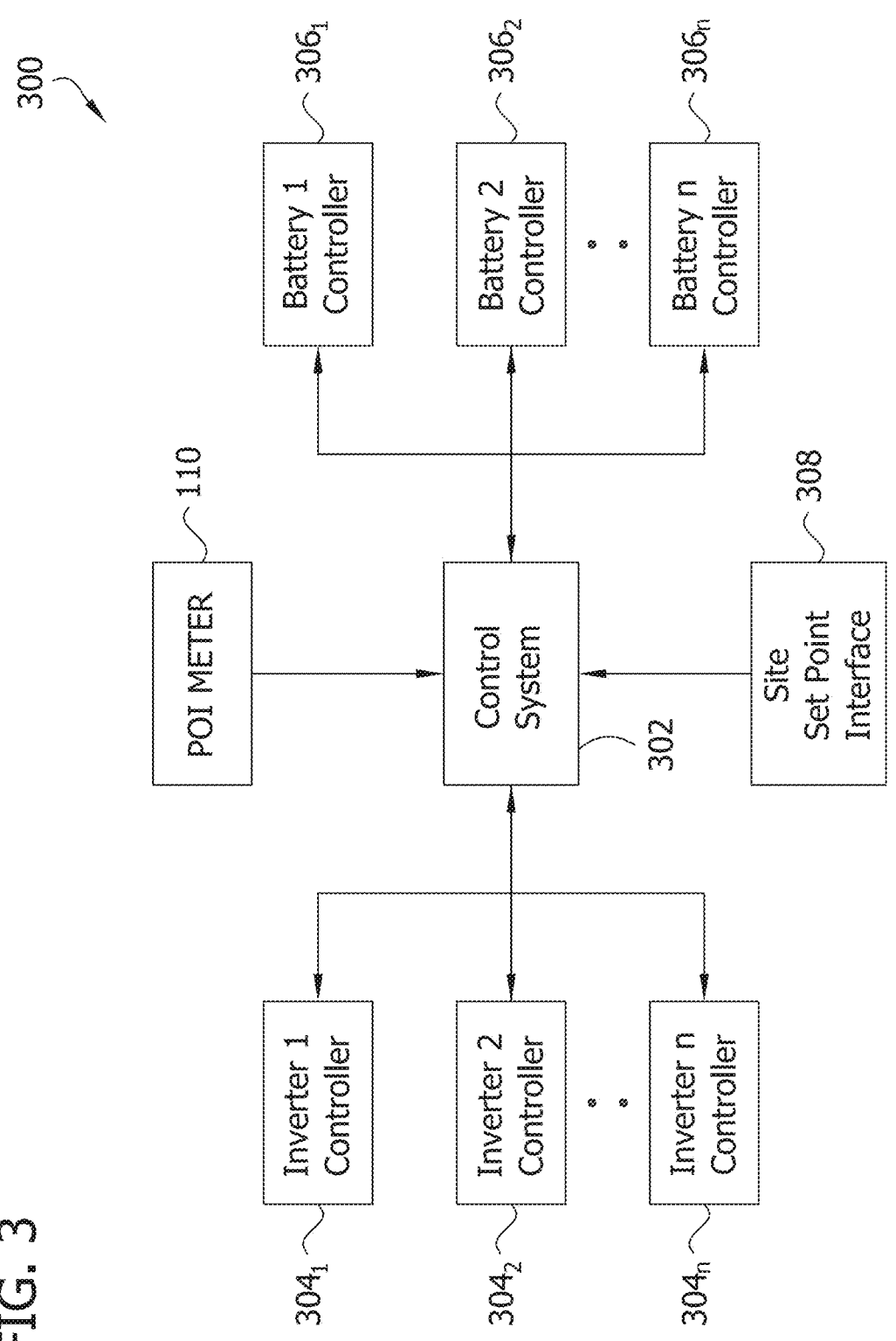
FIG. 3 is a system block diagram of a control system that may be used to control the power system shown in FIG. 1.

Referring to FIG. 3, power system $100$ also includes a control network $300$ that includes a number of different control components that exchange data using any wired or wireless communication protocol known in the art. In this embodiment, a control system $302$ is in communication with a plurality of PCS controllers $304_1$, $304_2$ to $304_n$, a plurality of battery controllers $306_1$, $306_2$ to $306_n$, a site set point interface $308$, and a POI meter $110$ (described above). PCS controllers $304_1$, $304_2$ to $304_n$ are associated with power conversion systems $102_1$, $102_2$ to $102_n$ described above, and transmit various types of data to control system $302$ (e.g., charge and discharge limits, metered power values as measured by the PCS, etc.) and receive real power and reactive power set points from control system $302$. Battery controllers $306_1$, $306_2$ to $306_n$ are associated with battery groups $104_1$, $104_2$ to $104_n$ described above, and transmit various types of data to control system $302$ (e.g., the number of battery racks online within a battery bank, the charge and discharge power limits for the battery bank, etc.). Site set point interface $308$ enables the provision of the site real and reactive power set points to control system $302$ and may comprise, for example, a graphical user interface (GUI) to enable manual input of the set points by an operator, a data link from a dispatching authority, an energy management system, etc.

In this embodiment, control system $302$ includes MD controllers, as is known in the art, as well as additional control software that optimizes the real and reactive power set points for each of power conversion systems $102_1$, $102_2$ to $102_n$ in accordance with the present invention. While control system $302$ is shown as a single system in FIG. 3, it should be understood that the various control methodologies described herein may be implemented by multiple systems that are either co-located or geographically dispersed. It should also be understood that PCS controllers $304_1$, $304_2$ to $304_n$ and battery controllers $306_1$, $306_2$ to $306_n$ may either be co-located or geographically dispersed.

In general terms, control system 302 calculates the real and reactive power set points for each of power conversion systems $102_1$, $102_2$ to $102_n$ utilizing one or more of: (1) a feedforward power compensation function that provides optimized site level set points for speed, accuracy and stability; (2) a real power set point derivation scheme in which the real power set points are selected based on the energy capacity of each of battery groups $104_1$, $104_2$ to $104_n$ to prevent state of charge (SOC) imbalancing, thus improving efficiency, runtime, wear, etc.; (3) an SOC balancing scheme that addresses SOC imbalance that has occurred, typically due to external factors; (4) a remainder function to account for real-time limits imposed by the equipment that would otherwise both prevent the correct set point from being dispatched and/or require the PID to further deal with the resulting failure to meet set point based on the feedback; and (5) a reactive power set point derivation scheme in which the reactive power set points are selected to minimize the total apparent power across the power sources to reduce the total apparent power/current across the entire site, thus reducing losses, heat, wear, etc. Control system 302 dispatches the real and reactive power set points to PCS controllers $304_1$, $304_2$ to $304_n$ for control of power conversion systems $102_1$, $102_2$ to $102_n$, which control the charging and discharging of the batteries in battery groups $104_1$, $104_2$ to $104_n$.

Unlike conventional control systems in which the PID controllers are required to provide relatively large corrections to compensate for differences between the site's power requirements and the actual power output at the POI as detected via a feedback loop, the control software of control system 302 optimizes the real and reactive power set points for each of power conversion systems $102_1$, $102_2$ to $102_n$ so that the actual power output at the POI is substantially close to the power requirements. This enables control system 302 to achieve a more precise final feedback so that the PID controllers are only required to provide slight adjustments to the real and reactive set points via the feedback loop. In fact, in some implementations, the feedback loop of the PID controllers may not even be required due to the optimization provided by the control methodologies described herein.

The ability of control system 302 to minimize deviations between the site's power requirements and the actual power output at the POI enables control system 302 to maintain smoother and faster plant performance. As a result, the real and reactive power response rates are much faster than with conventional control systems that rely solely on PID controllers designed to act as a smooth but relatively slow control means. In addition, the distribution schemes described herein maximize runtime, decrease wear, decrease heat, and increase efficiency of the batteries, as well as keep the batteries balanced across the entire site. The control methodologies used by control system 302 will be described in greater detail below in connection with FIGS. 4-6.

Control Methodologies

Referring to FIG. 4, a main control process that may be executed by control system 302 in accordance with one embodiment of the present invention is described with reference to steps 400-418.

In step 400, control system 302 receives a site real power set point and a site reactive power set point for power system 100, i.e., the set points for the power plant or other site. As used herein, a "site real power set point" is a real power set point for the site or a set point from which the real power set point for the site may be derived. A "site reactive power set point" is a reactive power set point for the site or a set point from which the reactive power set point for the site may be derived (e.g., a voltage set point, a power factor set point, etc.). It should be understood that the site real and reactive power set points are received from site set point interface 308.

In step 402, control system 302 limits the site real and reactive power set points based on site availability to determine a limited real power set point and a limited reactive power set point. For example, power conversion systems $102_1$, $102_2$ to $102_n$ and battery groups $104_1$, $104_2$ to $104_n$ typically have maximum power outputs that limit the total maximum power output of power system 100. If the site real and reactive power set points received in step 400 exceed the total maximum power output of power system 100, then the limited real and reactive power set points will be selected to account for those limits. As another example, some grid requirements limit a system's ramp rate. If the site real and reactive power set points received in step 400 would cause power system 100 to exceed the ramp rate, then the limited real and reactive power set points will be selected to account for those limits. Of course, if the site's limits have not been exceeded, then the limited real and reactive power set points will be the same as the site real and reactive power set points.

In step 404, control system 302 obtains the output of the PID controllers, i.e., the correction being applied by the MD. As discussed above, the output of the PID controllers will be relatively small compared to that of conventional control systems.

In step 406, control system 302 implements a feedforward power compensation function to determine a feedforward real power set point and a feedforward reactive power set point. The feedforward power compensation function adds a real power loss value to the limited real power set point to determine the feedforward real power set point, and adds a reactive power loss value to the limited reactive power set point to determine the feedforward reactive power set point. The real power loss value and the reactive power loss value are selected to compensate for power losses within system 100.

Some power losses may be calculated in real time using a power equation (e.g., $P=I^2R$). For example, the real power losses associated with one or more transformers in system 100 may be calculated in real time based on a metered current measurement (or a predicted current that is determined from a metered voltage measurement). It should be noted that the real power losses associated with the transformers may increase significantly if the voltage is dropped so as to cause the current to increase, wherein small current increases can result in large real power losses.

Other power losses are not readily calculated in real time (e.g., power losses associated with the site's auxiliary power system, losses due to cabling, etc.) and are instead quantified in terms of a predetermined real power loss and a predetermined reactive power loss that are obtained from data collected through empirical testing at the site, e.g., graphs/curves that correlate the limited real and reactive power set points derived in step 402 with real and reactive power losses, respectively. In this sense, the predetermined real and reactive power losses are a function of the limited real and reactive power set points, respectively. Of course, the predetermined real and reactive power losses may also be a function of other factors, such as the temperature at the site, the number of power conversion systems in service, the number of transformers in service, etc.

It should be understood that the feedforward power compensation function may be used in connection with control methodologies for a variety of different types of power sources in accordance with the present invention.

In step 408, control system 302 calculates a nominal real power set point for each of the power conversion systems $102_1$, $102_2$ to $102_n$ that are online and in automatic mode, i.e., an "available" power conversion system. In general terms, the feedforward real power set point is distributed across the available power conversion systems based on the energy capacity of the batteries connected to each available power conversion system. The following equation may be used to calculate the nominal real power set point for each available power conversion system:

$$PCS_iSP_P = (FFSP_P + PID_{out}) \times \frac{PCS_iEnergyCapacity}{\sum_{i=1}^{n}(PCS_iEnergyCapacity)} \quad (1)$$

where
   $PCS_iSP_P$=real power set point for power conversion system i;
   $FFSP_P$=feedforward real power set point (determined in step 406);
   $PID_{out}$=output of real power PID controller (obtained in step 404); and
   $PCS_iEnergyCapacity$=maximum amount of energy that can be stored in the batteries currently connected to power conversion system i (see equation (2)).

With respect to equation (1), $PCS_iEnergyCapacity$ may be calculated using the following equation:

$$PCS_iEnergyCapacity=\Sigma_{r=1}{}^n(MaxEnergy_r \times SOH_r) \quad (2)$$

where
   $PCS_iEnergyCapacity$=maximum amount of energy that can be stored in the batteries currently connected to power conversion system i;
   $MaeEnergy_r$=maximum energy that can be stored in energy storage device r (hard-coded number provided by the device vendor, or, provided by device controller); and
   $SOH_r$=state of health, i.e., current maximum energy capacity of energy storage device r currently connected to power conversion system i expressed as a percentage of rated energy capacity (provided by device controller).

One skilled in the art will understand that selection of the nominal real power set points as described above enables the batteries or energy storage devices to operate at substantially the same power level (i.e., charge/discharge evenly).

In step 410, control system 302 adjusts the real power set point for each of the available power conversion systems $102_1$, $102_2$ to $102_n$ in order to substantially balance the state of charge (SOC) of the batteries within power system 100. As used herein, the batteries are substantially balanced if the difference between the SOC of each battery and the SOC of every other battery within power system 100 is 50% or less (i.e., 50%, 40%, 30%, 20%, 10% or less) and more preferably 5% or less (i.e., 5%, 4%, 3%, 2%, 1% or 0%). For example, certain power conversion systems and associated battery racks may come online after others have already been online for some time and, as such, the batteries in those racks will have a higher SOC than the batteries in the other racks. Control system 320 will analyze the SOCs of all of the available batteries and take one or more steps to balance the SOCs, such as (1) adjusting the real power set points to discharge batteries having a higher SOC at a faster rate and/or (2) adjusting the real power set points to charge batteries having a lower SOC at a faster rate. Of course, control system 302 will also take into account the power limitations of the power conversion systems and associated batteries when balancing the SOCs.

Figure 5:
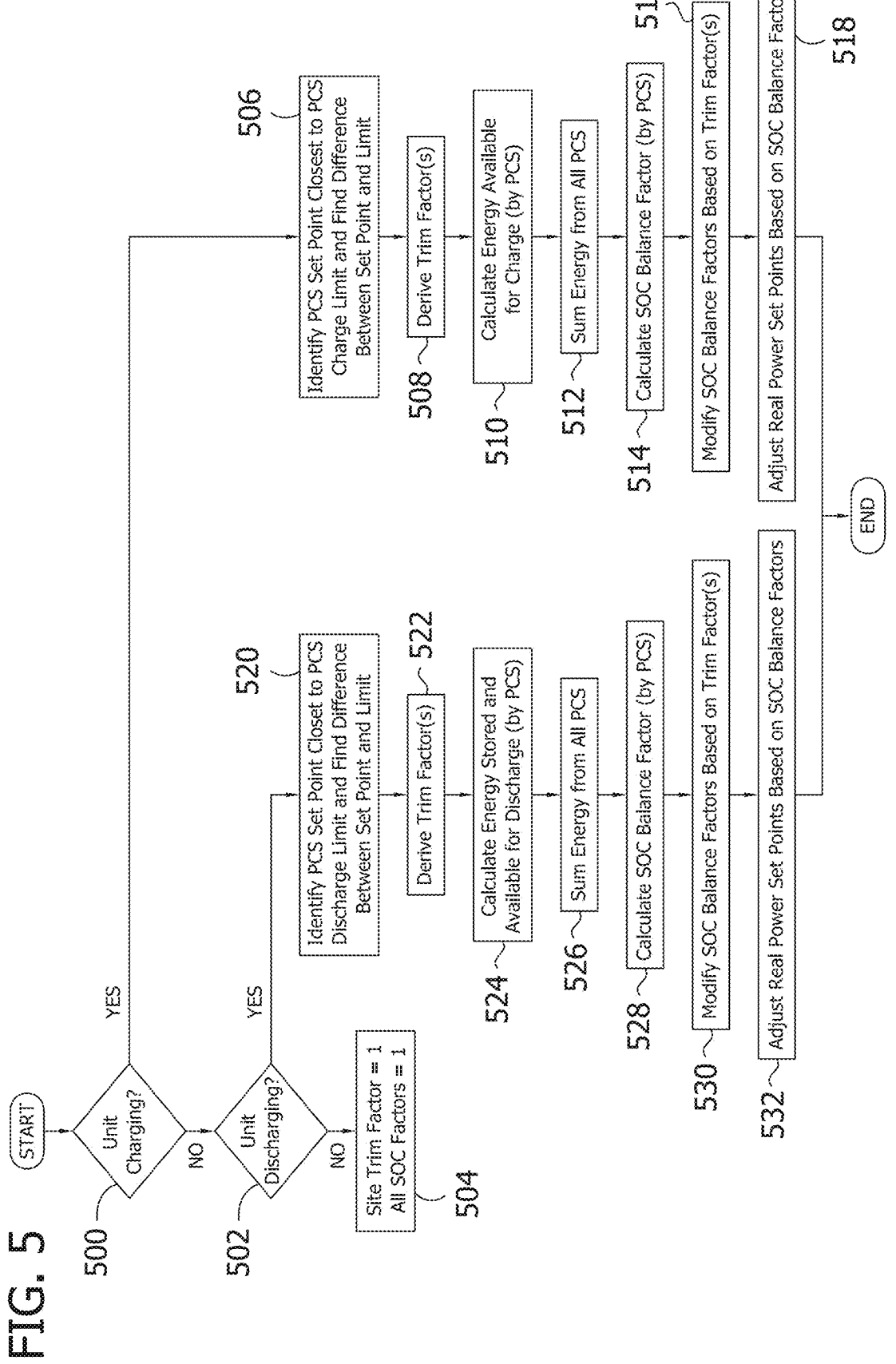
FIG. 5 is a process flow diagram of a process for balancing the state of charge of the batteries within the power system that may be executed as part of the main control process shown in FIG. 4.

Referring to FIG. 5, a process for balancing the state of charge of the batteries within power system 100 that may be executed by control system 302 in accordance with one embodiment of the present invention is described with reference to steps 500-528.

In step 500, control system 302 determines whether the batteries within power system 100 are charging. If so, control system 302 performs steps 506 to 518, described below. If not, in step 502, control system 302 determines whether the batteries within power system 100 are discharging. If so, control system 302 performs steps 520 to 532, described below. If not, in step 504, control system 302 sets the site trim factor and all SOC factors to 1.

If the batteries within power system 100 are charging, control system 302 performs steps 506 to 518. In step 506, control system 302 selects the power conversion system with a real power set point that is closest to the power conversion system's charge limit and calculates the difference between the set point and charge limit. In step 508, control system 302 derives a site trim factor, i.e., the factor that regulates the aggression level of the SOC balancer. For example, if the batteries of power system 100 are approaching the site power limit, the SOC balancer will reduce its aggression level. The site trim factor may be calculated as follows:

$$(3)$$

$$SiteTrimFactor = $$
$$HighSelect\left(\left|\frac{ChrgDevMin}{SOCFactorMax}\right|, \left|\frac{FFSP_P - SiteChrgLowLimit}{SiteChargeLowLimit}\right|\right)$$

where
   SiteTrimFactor=factor used to regulate the aggression level of the SOC balancer;
   HighSelect=take the largest of a group of values;
   ChrgDevMin=the smallest difference between the real power set point and the charge limit of all of the power conversion systems;
   SOCFactorMax=the largest SOC balancing factor of all of the power conversion systems prior to the impact of the site trim factor;
   $FFSP_P$=feedforward real power set point (determined in step 406); and
   SiteChrgLowLimit=real-time maximum set point allowable in the charge direction based on available power conversion systems, batteries, etc. (derived by control device 302).

In step 510, control system 302 calculates the energy available for charge that is connected to each power conversion system, as follows:

$$PCS_iEnergy=\Sigma_{r=1}{}^n((SOC_{rmax}-SOC_r) \times SOH_r \times MaxEnergy_r) \quad (4)$$

where
   $PCS_iEnergy$=the energy available for charge that is connected to power conversion system i;
   $SOC_{rmax}$=the maximum allowable state of charge for the energy storage device r connected to power conversion system i (hard-coded number based on device manu-
facturer design, or an operator set point);

$SOC_r$=state of charge; i.e., energy currently stored in
energy storage device r currently connected to power
conversion system i expressed as a percentage of
current maximum energy capacity (provided by device
controller);

$SOH_r$=state of health, i.e., current maximum energy
capacity of energy storage device r currently connected
to power conversion system i expressed as a percentage
of rated energy capacity (provided by device control-
ler); and $MaxEnergy_r$=maximum energy that can be stored in
energy storage device r (hard-coded number provided
by the device vendor, or, provided by device control-
ler).

In step 512, control system 302 sums the $PCS_i$Energy for
each of the power conversion systems in order to obtain a
total energy of the batteries connected to the power conver-
sion systems that is available for charge.

In step 514, control device 302 calculates the ratio of
attached energy stored/available for power conversion sys-
tem i as compared to the sum of all of the power conversion
system's attached energy stored/available and divides that
ratio by the ratio of attached energy capacity for power
conversion system i as compared to the sum of all of the
power conversion system's attached energy capacity (i.e.,
the average SOC of power conversion system i divided by
the average SOC of the site), as follows:

$$SOC_iFactor = \frac{PCS_iEnergy \times \sum_{i=1}^{n} PCS_iEnergyCapacity}{PCS_iEnergyCapacity \times \sum_{i=1}^{n} PCS_iEnergy} \quad (5)$$

where $SOC_iFactor$=SOC balancing factor applied as a bias to the
real power set point for power conversion system i;

$PCS_iEnergy$=the energy available for charge that is con-
nected to power conversion system i (see equation (4));
and $PCS_iEnergyCapacity$=maximum amount of energy that
can be stored in the batteries currently connected to
power conversion system i (see equation (2)).

In step 516, control system 302 adjusts the SOC balancing
factor based on the site trim factor, as follows:

$$Dispatched SOC_iFactor=(((SOC_iFactor-1)\times SiteTrim-Factor)+1) \quad (6)$$

where $DispatchedSOC_iFactor$=final SOC factor used as bias for
dispatched real power set point for power conversion
system i;

$SOC_iFactor$=SOC balancing factor applied as a bias to the
real power set point for power conversion system i; and $SiteTrimFactor$=factor used to regulate the aggression
level of the SOC balancer.

Finally, in step 518, control system 302 adjusts the real
power set points based on the SOC balancing factors.

If the batteries within power system 100 are discharging,
control system 302 performs steps 520 to 532. In step 520,
control system 302 selects the power conversion system
with a real power set point that is closest to the power
conversion system's discharge limit and calculates the dif-
ference between the set point and discharge limit. In step
522, control system 302 derives a site trim factor, i.e., the factor that regulates the aggression level of the SOC bal-
ancer. The site trim factor may be calculated as follows:

$$SiteTrimFactor = \qquad (7)$$

$$HighSelect\left(\left|\frac{DischDevMin}{SOCFactorMax}\right|, \left|\frac{FFSP_P - SiteDischHighLimit}{SiteDischHighLimit}\right|\right)$$

where $SiteTrimFactor$=factor used to regulate the aggression
level of the SOC balancer;

$HighSelect$=take the largest of a group of values;

$DischDevMin$=the smallest difference between the real
power set point and the discharge limit of all of the
power conversion systems;

$SOCFactorMax$=the largest SOC balancing factor of all of
the power conversion systems prior to the impact of the
site trim factor;

$FFSP_P$=feedforward real power set point (determined in
step 406); and $PlantDischHighLimit$=real-time maximum set point
allowable in the discharge direction based on available
power conversion systems, batteries, etc. (derived by
control device 302).

In step 524, control system 302 calculates the energy
available for discharge that is connected to each power
conversion system, as follows:

$$PCS_iEnergy=\Sigma_{r=1}^{n}((SOC_r-SOC_{rmax})\times SOH_r\times MaxEn-ergy_r) \qquad (8)$$

where $PCS_iEnergy$=the energy available for discharge that is
connected to power conversion system i;

$SOC_{rmax}$=the maximum allowable state of charge for the
energy storage device r connected to power conversion
system i (hard-coded number based on device manu-
facturer design, or an operator set point);

$SOC_r$=state of charge; i.e., energy currently stored in
energy storage device r currently connected to power
conversion system i expressed as a percentage of
current maximum energy capacity (provided by device
controller);

$SOH_r$=state of health, i.e., current maximum energy
capacity of energy storage device r currently connected
to power conversion system i expressed as a percentage
of rated energy capacity (provided by device control-
ler); and $MaxEnergy_r$=maximum energy that can be stored in
energy storage device r (hard-coded number provided
by the device vendor, or, provided by device control-
ler).

In step 526, control system 302 sums the $PCS_i$Energy for
each of the power conversion systems in order to obtain a
total energy of the batteries connected to the power conver-
sion system that is available for discharge.

In step 528, control device 302 calculates the ratio of
attached energy stored/available for power conversion sys-
tem i as compared to the sum of all of the power conversion
system's attached energy stored/available and divides that
ratio by the ratio of attached energy capacity for power
conversion system i as compared to the sum of all of the
power conversion system's attached energy capacity (i.e.,
the average SOC of power conversion system i divided by
the average SOC of the site), as follows:

US 12,573,853 B2

13

Figure 6:
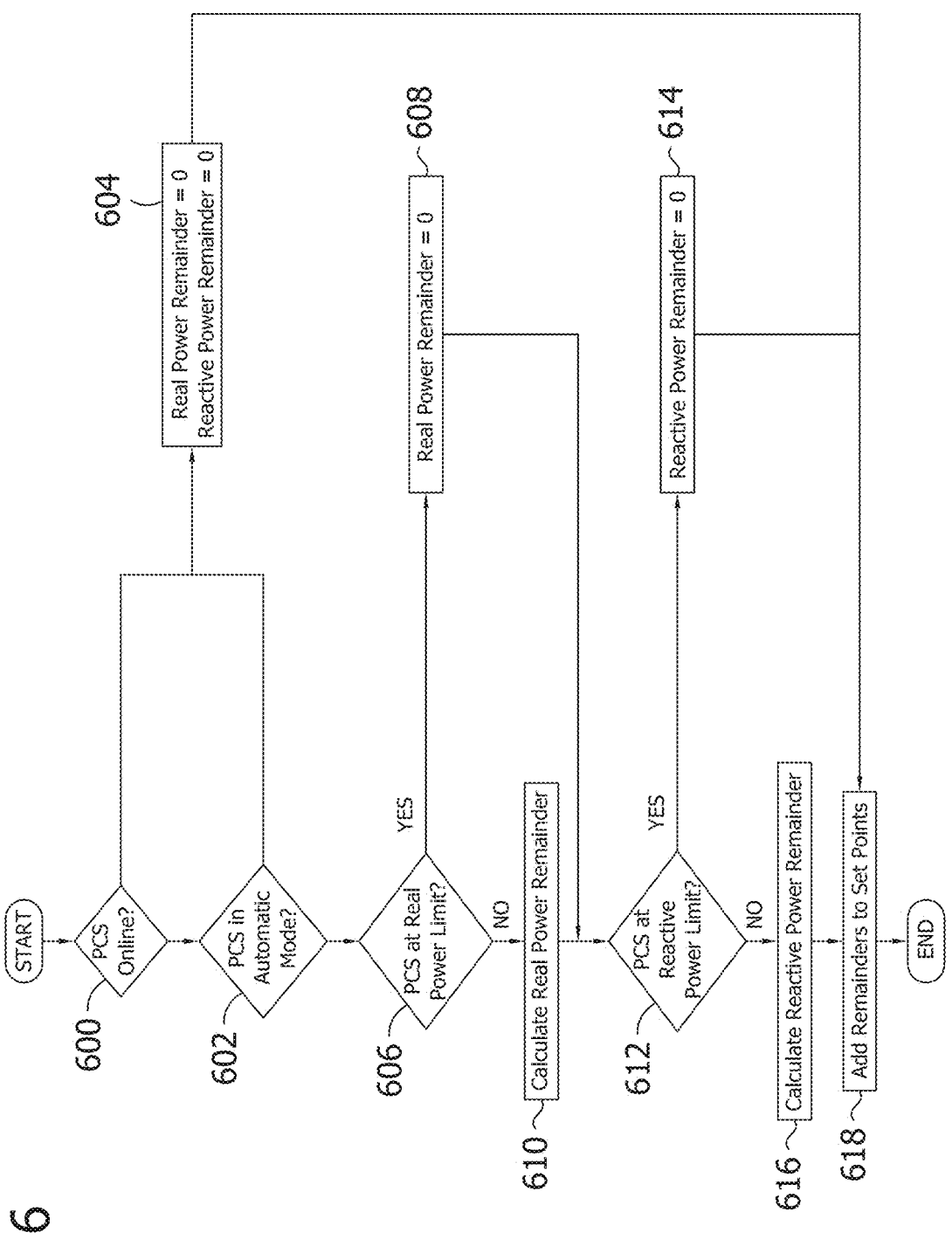
FIG. 6 is a process flow diagram of a process for implementing a remainder function that may be executed as part of the main control process shown in FIG. 4.

14

$$SOC_i\text{Factor} = \frac{PCS_i\text{Energy} \times \sum_{i=1}^{n} PCS_i EnergyCapacity}{PCS_i EnergyCapacity \times \sum_{i=1}^{n} PCS_i\text{Energy}} \quad (9)$$

where
SOC_iFactor=SOC balancing factor applied as a bias to the real power set point for power conversion system i;
PCS_iEnergy=the energy available for discharge that is connected to power conversion system i (see equation (8)); and
PCS_iEnergyCapacity=maximum amount of energy that can be stored in the batteries currently connected to power conversion system i (see equation (2)).
In step 530, control system 302 adjusts the SOC balancing factor based on the site trim factor, as follows:

$$DispatchedSOC_i\text{Factor}=(((SOC_i\text{Factor}-1)\times SiteTrim\text{-}Factor)+1) \quad (10)$$

where
DispatchedSOC_iFactor=final SOC factor used as bias for dispatched real power set point for power conversion system i;
SOC_iFactor=SOC balancing factor applied as a bias to the real power set point for power conversion system i; and
SiteTrimFactor=factor used to regulate the aggression level of the SOC balancer.
Finally, in step 532, control system 302 adjusts the real power set points based on the SOC balancing factors.
Referring back to FIG. 4, in step 412, control system 302 calculates a nominal reactive power set point for each of the power conversion systems 102_1, 102_2 to 102_n that are online and in automatic mode, i.e., an "available" power conversion system. In general terms, the feedforward reactive power set point is distributed across the available power conversion systems in order to minimize the total apparent power across power conversion systems 102_1, 102_2 to 102_n to thereby minimize heat and other losses. The following equation may be used to calculate the nominal reactive power set point for each available power conversion system:

$$PCS_iSP_Q = (FFSP_Q + PID_{out}) \times \left| \frac{PCS_i\text{Limit}_Q}{\sum_{i=1}^{n} PCS_i\text{Limit}_Q} \right| \quad (11)$$

where
PCS_iSP_Q=reactive power set point for power conversion system i;
FFSP_Q=feedforward reactive power set point (determined in step 406);
PID_{out}=output of reactive power PID controller (obtained in step 404); and
PCS_iLimit_Q=reactive power limit for power conversion system i.
In step 414, control system 302 determines the real and reactive power limits for each of power conversion systems 102_1, 102_2 to 102_n and each of battery groups 104_1, 104_2 to 104_n. If the adjusted real power set point calculated in step 410 exceeds a real power limit for any of power conversion systems 102_1, 102_2 to 102_n, then the real power set point will be decreased to a limited real power set point for the power conversion system. Similarly, if the adjusted reactive power set point calculated in step 412 exceeds a reactive power limit for any of power conversion systems 102_1, 102_2 to 102_n, then the reactive power set point will be decreased to a limited reactive power set point for the power conversion system.
In step 416, control system 302 adjusts the real and/or reactive power set points for power conversion systems 102_1, 102_2 to 102_n based on a remainder function that (a) calculates the total deviation in the real power set points due to the power limiting function applied in step 414 and redistributes that total deviation to the power conversion systems that are online, in automatic mode, and not already operating at their maximum real power limits and (b) calculates the total deviation in the reactive power set points due to the power limiting function applied in step 414 and redistributes that total deviation to the power conversion systems that are online, in automatic mode, and not already operating at their maximum reactive power limits. This process prevents the top level MD controls from having to make adjustments to compensate for power conversion systems failing to meet their respective set points, which results in less deviations from the overall site set points and maintains smoother plant performance.
In particular, for each power conversion system, control system 302 determines the difference between the adjusted real power set point calculated in step 410 (after SOC balancing) and the limited real power set point calculated in step 414 to determine a real power remainder value. Control system 302 then sums those differences and redistributes the sum among all power conversion systems that are online, in automatic mode, and not already operating at their maximum real power limit. If a particular power conversion system is not online, is not in automatic mode, or is at its maximum real power limit, then the real power remainder value that is added to that PCS real power set point is 0.
Similarly, for each power conversion system, control system 302 determines the difference between the nominal reactive power set point calculated in step 412 and the limited reactive power set point calculated in step 414 to determine a reactive power remainder value. Control system 302 then sums those differences and redistributes the sum among all power conversion systems that are online, in automatic mode, and not already operating at their maximum reactive power limit. If a particular power conversion system is not online, is not in automatic mode, or is at its maximum reactive power limit, then the reactive power remainder value that is added to that PCS real power set point is 0.
Referring to FIG. 6, a process for implementing a remainder function that may be executed by control system 302 for each of power conversion systems 102_1, 102_2 to 102_n in accordance with one embodiment of the present invention is described with reference to steps 600-618.
In steps 600 and 602, control system 302 determines whether a power conversion system is both online and in an automatic mode. If not, then the process proceeds to step 604 where the real power remainder value and the reactive power remainder value are both set to 0.
In step 606, if the power conversion system is online and in automatic mode, control system 302 determines whether the power conversion system is at its maximum real power limit. If so, then the process proceeds to step 608 and the real power remainder value is set to 0. In step 610, if the power conversion system is not at its maximum real power limit, control device 302 calculates the real power remainder value using the following equation:

$$PCS_i\text{Remainder}_P =$$

$$\frac{\left(\sum_{i=1}^{n}(PCS_iSP_P - PCS_iLimitedSP_P)\right)}{\sum_{i=1}^{n}(PCS_iEnergyCapacity)} \times PCS_iEnergyCapacity \quad (12)$$

where

PCS$_i$Remainder$_P$=additional real power remainder value added to the real power set point for power conversion system i to account for deficiencies in other power conversion systems;

PCS$_i$SP$_P$=real power set point for power conversion system i (calculated in step 408);

PCS$_i$LimitedSP$_P$=limited real power set point for power conversion system i (calculated in step 414); and PCS$_i$EnergyCapacity=maximum amount of energy that can be stored in the batteries currently connected to power conversion system i (only if power conversion system i is online, in automatic mode, and not already operating at its maximum real power limit).

In step 612, control system 302 determines whether the power conversion system is at its maximum reactive power limit. If so, then the process proceeds to step 614 and the reactive power remainder value is set to 0. In step 616, if the power conversion system is not at its maximum reactive power limit, control device 302 calculates the reactive power remainder value using the following equation:

$$PCS_i\text{Remainder}_Q = \frac{\left(\sum_{i=1}^{n}(PCS_iSP_Q - PCS_iLimitedSP_Q)\right)}{\sum_{i=1}^{n}(PCS_iLimit_Q)} \times PCS_iLimit_Q \quad (13)$$

where

PCS$_i$Remainder$_Q$=additional reactive power remainder value added to the reactive power set point for power conversion system i to account for deficiencies in other power conversion systems;

PCS$_i$SP$_Q$=reactive power set point for power conversion system i (calculated in step 412);

PCS$_i$LimitedSP$_Q$=limited reactive power set point for power conversion system i (calculated in step 414); and PCS$_i$Limit$_Q$=reactive power limit for power conversion system i.

In step 618, for each of the power conversion systems, control system 302 individually adds the applicable real power remainder values and reactive power remainder values (as calculated in steps 604, 608, 610, 614 and 416) to the limited real power set points and limited reactive power set points calculated in step 414, respectively.

Referring back to FIG. 4, in step 418, control system 302 dispatches a demand based on the real and reactive power set points calculated in step 416 to each of PCS controllers 304$_1$, 304$_2$ to 304$_n$. Each of PCS controllers 304$_1$, 304$_2$ to 304$_n$ then uses the demand to control the operation of power control systems 102$_1$, 102$_2$ to 102$_n$ and their associated battery groups 104$_1$, 104$_2$ to 104$_n$.

Finally, the process returns to step 400 so as to repeat steps 400-418. In this embodiment, steps 400-418 are repeated at regular intervals (e.g., every 100 milliseconds) so as to continuously make adjustments to the real and reactive power set points of each power system converter in order to meet the site's power requirements. Of course, in other embodiments, steps 400-418 may be repeated at irregular time intervals. Further, step 400 may occur regularly or irregularly and, as such, the latest received set points will be used.

One skilled in the art will understand that the present invention is not limited to the embodiments described above and that other embodiments are also possible. For example, some embodiments may only utilize the feedforward power compensation function, some embodiments may only utilize the SOC balancer, some embodiments may only use the remainder function, etc. Thus, it should be understood that various combinations of control features may be utilized in accordance with the present invention.

General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as" or "for example") provided with respect to certain embodiments is intended merely to better describe the invention and does not pose a limitation on the scope of the invention. No language in the description should be construed as indicating any non-claimed element essential to the practice of the invention.

The use of the terms "comprises," "comprising," or any other variation thereof, are intended to cover a non-exclusive inclusion, such that a system or method that comprises a list of elements does not include only those elements, but may include other elements not expressly listed or inherent to such system or method.

Finally, while the present invention has been described and illustrated hereinabove with reference to various exemplary embodiments, it should be understood that various modifications could be made to these embodiments without departing from the scope of the invention. Therefore, the present invention is not to be limited to the specific system configurations or control methodologies of the exemplary embodiments, except insofar as such limitations are included in the following claims.

What is claimed and desired to be secured by Letters Patent is as follows:

1. A power system, comprising:

a plurality of power sources for supplying power to or absorbing power from an AC load, wherein each of the power sources comprises a power conversion system associated with one or more energy storage devices; and a control system configured to individually control each of the power sources by:

calculating a nominal real power set point for each of the power sources, wherein the nominal real power set point is calculated based on a maximum energy capacity of the one or more energy storage devices of the power source, a state of health associated with each of the one or more energy storage devices, and a total energy capacity of available energy storage devices within the power system; and dispatching a real power demand based on the nominal real power set point to each of the power sources.

2. The power system of claim 1, wherein the control system is configured to adjust the nominal real power set point via application of one or more of (a) a state of charge balancer, (b) a power limiting function, and (c) a remainder function.

3. The power system of claim 2, wherein the state of charge balancer is configured to substantially balance the state of charge of available energy storage devices within the power system.

4. The power system of claim 2, wherein the power limiting function is configured to limit the nominal real power set point of one or more of the power sources based on a maximum real power limit of each of the one or more power sources.

5. The power system of claim 2, wherein the remainder function is configured to redistribute a total deviation in real power set points attributable to the power limiting function to a plurality of the power sources.

6. A power system, comprising:
a plurality of power sources for supplying power to an AC load, wherein each of the power sources comprises a power conversion system associated with one or more energy storage devices; and
a control system configured to control each of the power sources by:
calculating a nominal real power set point for the power source based on a state of health associated with each of the one or more energy storage devices;
calculating a state of charge balance factor for the power source;
adjusting the nominal real power set point based on the state of charge balance factor to determine an adjusted real power set point; and
dispatching a real power demand based on the adjusted real power set point to the power source.

7. The power system of claim 6, wherein the nominal real power set point is calculated based on an energy capacity of the one or more energy storage devices of the power source and a total energy capacity of available energy storage devices within the power system.

8. The power system of claim 6, wherein the state of charge balance factor is determined by a state of charge balancer configured to substantially balance the state of charge of available energy storage devices within the power system.

9. The power system of claim 8, wherein the state of charge balance factor is calculated based on a trim factor that indicates an aggression level for balancing the state of charge of available energy storage devices within the power system.

10. The power system of claim 6, wherein the state of charge balance factor is calculated based on a current state of charge of the one or more energy storage devices of the power source.

11. The power system of claim 10, wherein the state of charge balance factor is calculated based on (i) if the one or more energy storage devices of the power source are charging, a maximum allowable state of charge of the one or more energy storage devices or (ii) if the one or more energy storage devices of the power source are discharging, a minimum allowable state of charge of the one or more energy storage devices.

12. The power system of claim 11, wherein the state of charge balance factor is calculated based on a current state of health of the one or more energy storage devices of the power source.

13. The power system of claim 6, wherein the control system is further configured to adjust the nominal real power set point via application of one or more of (a) a power limiting function and (b) a remainder function.

14. The power system of claim 13, wherein the power limiting function is configured to limit the adjusted real power set point of one or more of the power sources based on a maximum real power limit of each of the one or more power sources.

15. The power system of claim 13, wherein the remainder function is configured to redistribute a total deviation in real power set points attributable to the power limiting function to a plurality of the power sources.

16. The power system of claim 6, wherein the control system is further configured to control each of the power sources by:
calculating a nominal reactive power set point for the power source; and
dispatching a reactive power demand based on the nominal reactive power set point to the power source.

17. The power system of claim 16, wherein the nominal reactive power set point is calculated based on a reactive power limit for the power source and a total reactive power limit for available power sources within the power system.

18. The power system of claim 16, wherein the control system is configured to adjust the nominal reactive power set point via application of one or more of (a) a power limiting function and (b) a remainder function.

19. The power system of claim 18, wherein the power limiting function is configured to limit the adjusted reactive power set point of one or more of the power sources based on a maximum reactive power limit of each of the one or more power sources.

20. The power system of claim 18, wherein the remainder function is configured to redistribute a total deviation in reactive power set points attributable to the power limiting function to a plurality of the power sources.

* * * * *